US012381342B2

(12) United States Patent
Hsu et al.

(10) Patent No.: US 12,381,342 B2
(45) Date of Patent: Aug. 5, 2025

(54) ELECTRICAL CONNECTOR AND CIRCUIT BOARD SEAT

(71) Applicant: EZCONN CORPORATION, New Taipei (TW)

(72) Inventors: Shu-Mei Hsu, New Taipei (TW); Kai-Chih Wei, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 487 days.

(21) Appl. No.: 17/942,766

(22) Filed: Sep. 12, 2022

(65) Prior Publication Data

US 2024/0047905 A1 Feb. 8, 2024

(30) Foreign Application Priority Data

Aug. 3, 2022 (TW) ................................ 111208334

(51) Int. Cl.
*H01R 12/70* (2011.01)
*H01R 12/72* (2011.01)
*H01R 103/00* (2006.01)

(52) U.S. Cl.
CPC ....... *H01R 12/7047* (2013.01); *H01R 12/721* (2013.01); *H01R 2103/00* (2013.01)

(58) Field of Classification Search
CPC ............ H01R 12/7005; H01R 12/7011; H01R 12/7047; H01R 24/50; H01R 12/72; H01R 12/721; H01R 12/722
USPC ........................................................ 439/79
See application file for complete search history.

(56) References Cited

U.S. PATENT DOCUMENTS

| | | | | |
|---|---|---|---|---|
| 5,743,751 A * | 4/1998 | Davis | H01R 12/7047 439/79 |
| 6,231,355 B1 * | 5/2001 | Trammel | H01R 12/721 439/79 |
| 6,361,107 B1 * | 3/2002 | Alexander | A47C 7/008 248/188.5 |
| 7,500,855 B2 * | 3/2009 | Kari | H01R 24/50 439/63 |
| 2012/0083138 A1 * | 4/2012 | Liu | H01R 24/50 439/55 |
| 2021/0273385 A1 * | 9/2021 | Kim | H05K 1/117 |
| 2025/0070521 A1 * | 2/2025 | Shelly | H01R 24/50 |

* cited by examiner

*Primary Examiner* — Abdullah A Riyami
*Assistant Examiner* — Amara Anderson
(74) *Attorney, Agent, or Firm* — Maschoff Brennan

(57) ABSTRACT

An electrical connector includes a signal joint and a circuit board seat. The circuit board seat includes a seat body, a clamp component and a mount component. The seat body includes a base portion, a mount portion and a clamp portion. The base portion is fixed to the signal joint, the mount portion and the clamp portion are respectively connected to two opposite sides of the base portion, and the base portion, the mount portion and the clamp portion together form an accommodation recess. The clamp component is movably located in the accommodation recess. The clamp component and the clamp portion together form an installation space, and the installation space is configured to accommodate a circuit board. The mount component is movably disposed through the mount portion of the seat body of the circuit board seat, and the mount component is connected to the clamp component.

9 Claims, 6 Drawing Sheets

ELECTRICAL CONNECTOR AND CIRCUIT BOARD SEAT

CROSS-REFERENCE TO RELATED APPLICATIONS

This non-provisional application claims priority under 35 U.S.C. § 119(a) on Patent Application No(s). 111208334 filed in Taiwan, R.O.C. on Aug. 3, 2022, the entire contents of which are hereby incorporated by reference.

TECHNICAL FIELD

The disclosure relates to an electrical connector and a circuit board seat, more particularly to an electrical connector and a circuit board seat having a clamp component and a mount component integrated thereon.

BACKGROUND

In the market, there is a type of coaxial electrical connector for a test circuit board to be laterally installed thereon. The test circuit board can test a signal transmitted from a coaxial cable connected to the coaxial electrical connector.

Conventionally, the test circuit board is fixed to the coaxial electrical connector by assembling a variety of components, such as screws, gaskets and so on. However, the aforementioned components are separate from one another before they are assembled, which may cause some of the components to go missing accidentally. Moreover, during the installation of the test circuit board on the coaxial electrical connector, the aforementioned components are required to be sequentially assembled one by one, which is troublesome and time-consuming. Accordingly, how to solve the above issue is one of the crucial topics in this field.

SUMMARY

The disclosure provides an electrical connector and a circuit board seat which enable a circuit board to be installed thereon in an efficient manner and prevent the components that fix the circuit board from going missing.

One embodiment of the disclosure provides an electrical connector. The electrical connector is configured for an installation of a circuit board. The electrical connector includes a signal joint and a circuit board seat. The circuit board seat includes a seat body, a clamp component, and at least one mount component. The seat body includes a base portion, a mount portion and at least one clamp portion. The base portion is fixed to the signal joint, the mount portion and the clamp portion are respectively connected to two opposite sides of the base portion, and the base portion, the mount portion and the clamp portion together form an accommodation recess. The clamp component is movably located in the accommodation recess. The clamp component and the clamp portion together form an installation space, and the installation space is configured to accommodate the circuit board. The mount component is movably disposed through the mount portion of the seat body of the circuit board seat, and the mount component is connected to the clamp component.

Another embodiment of the disclosure provides an electrical connector. The electrical connector is configured for an installation of a circuit board. The electrical connector includes a signal joint and a circuit board seat. The circuit board seat includes a seat body, a clamp component and at least one mount component. The seat body is fixed to the signal joint and has a clamp portion. The clamp component is movably disposed on the seat body. The clamp component and the clamp portion together form an installation space.

The mount component is movably disposed on the seat body. The mount component comprises a first portion and a second portion connected to each other, the second portion is connected to the clamp component. The seat body, the clamp component and the mount component together constitute one body, and the first portion is located farther away from the clamp portion than the second portion.

Still another embodiment provides a circuit board seat. The circuit board seat is configured for an installation of a circuit board. The circuit board seat includes a seat body, a clamp component, and at least one mount component. The seat body includes a base portion, a mount portion and at least one clamp portion. The base portion is fixed to the signal joint, the mount portion and the clamp portion are respectively connected to two opposite sides of the base portion, and the base portion, the mount portion and the clamp portion together form an accommodation recess. The clamp component is movably located in the accommodation recess. The clamp component and the clamp portion together form an installation space, and the installation space is configured to accommodate the circuit board. The mount component is movably disposed through the mount portion of the seat body of the circuit board seat, and the mount component is connected to the clamp component.

According to the electrical connectors and the circuit board seat as discussed in the above embodiments, the clamp component is movably located in the accommodation recess of the seat body of the circuit board seat, the mount portion is provided on the seat body for the mount component to be movably disposed therethrough, and the mount component is connected to the clamp component. Therefore, before the circuit board is installed on the seat body, the clamp component and the mount component are already integrated on the seat body. As a result, during the installation of the circuit board onto the seat body, there is no need to sequentially assemble the clamp component and the mount component, thereby increasing the installation efficiency of the circuit board and preventing the clamp component and the mount component from going missing.

In addition, the mount component is movably disposed on the seat body, and the second portion of the mount component is connected to clamp component, such that the seat body, the clamp component and the mount component constitute one body, and the first portion of the mount component is located farther away from the clamp portion than the second portion. As a result, before the circuit board is installed on the seat body of the circuit board seat, the clamp component and the mount component are already integrated on the seat body of the circuit board seat. Therefore, during the installation of the circuit board onto the seat body, there is no need to sequentially assemble the clamp component and the mount component, thereby increasing the installation efficiency of the circuit board and preventing the clamp component and the mount component from going missing.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
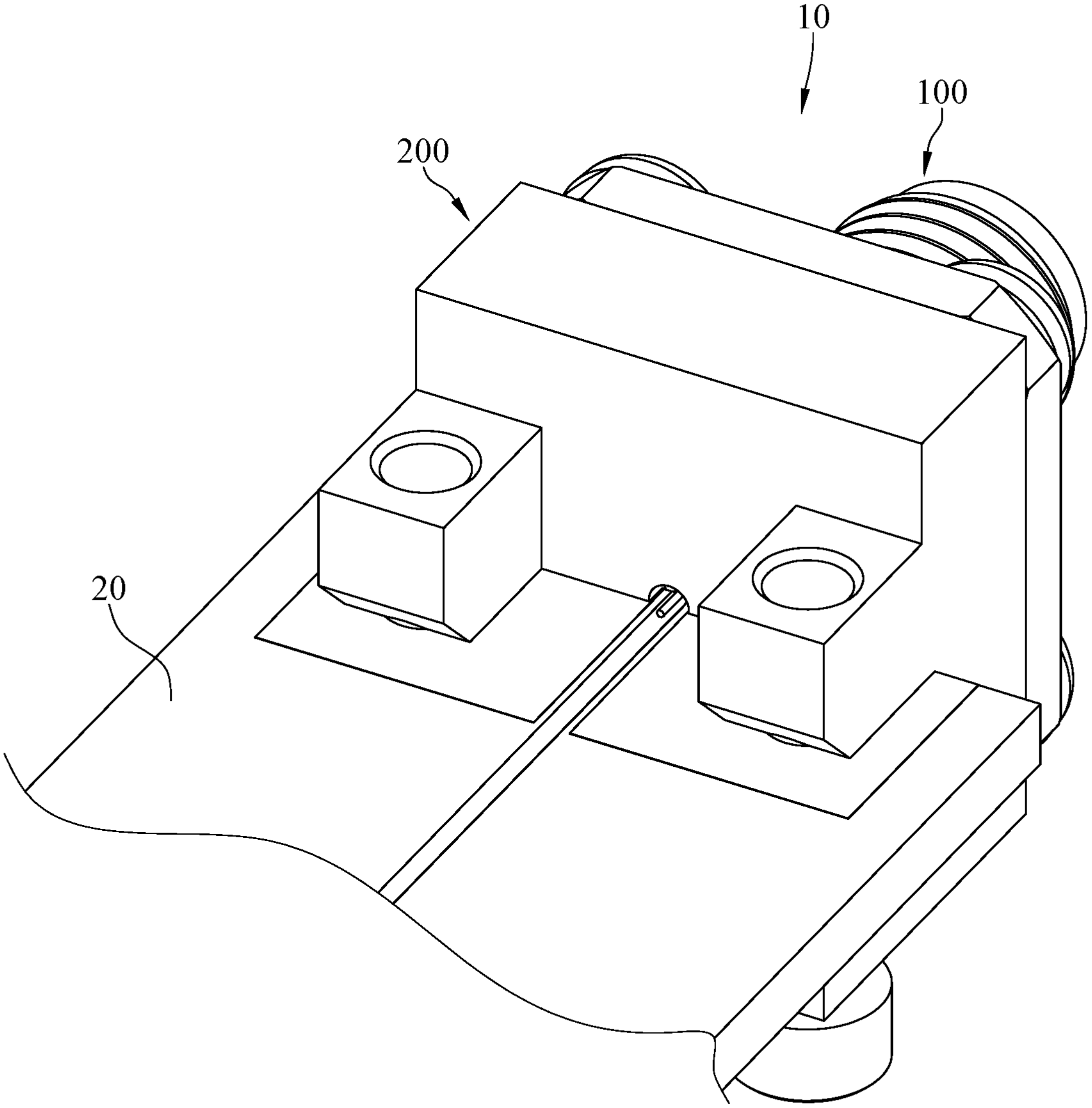
FIG. 1 is a partial perspective view of an electrical connector according to one embodiment of the disclosure and a circuit board.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
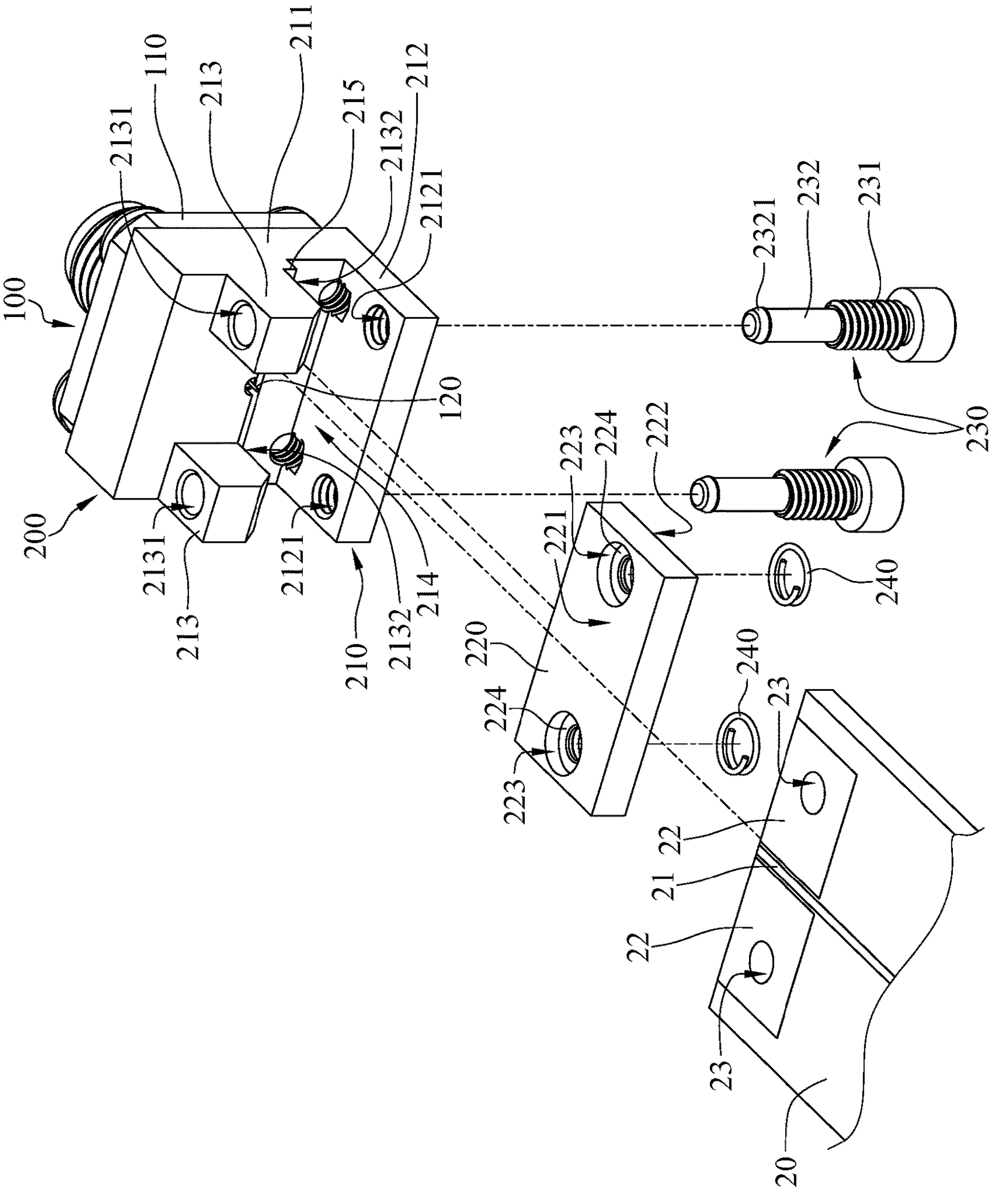
FIG. 2 is an exploded view of the electrical connector and the circuit board in FIG. 1.
Figure 3:
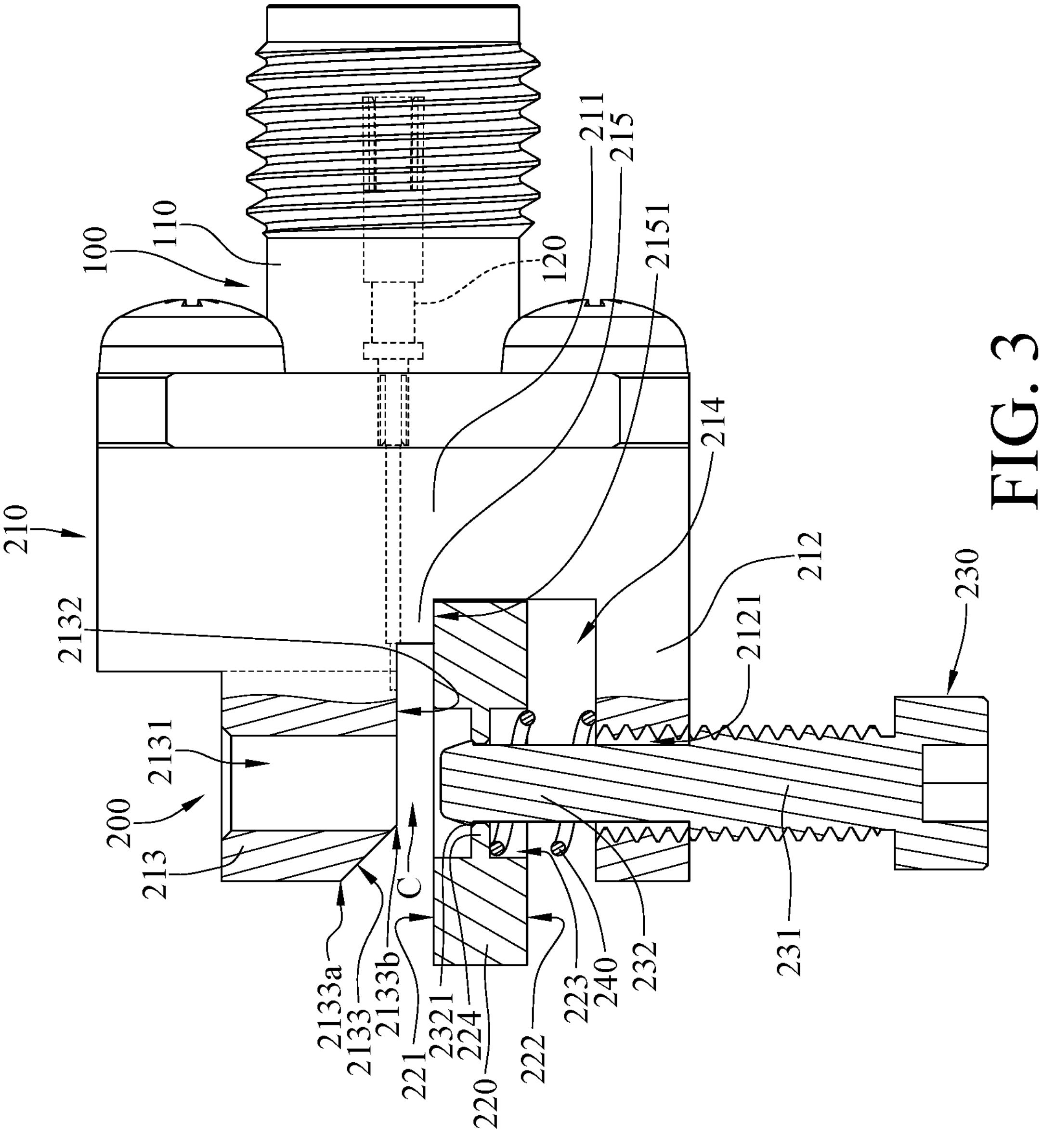
FIG. 3 is a partial cross-sectional view of the electrical connector in FIG. 1.

Referring to FIGS. 1 to 3, where FIG. 1 is a partial perspective view of an electrical connector 10 according to one embodiment of the disclosure and a circuit board 20, FIG. 2 is an exploded view of the electrical connector 10 and the circuit board 20 in FIG. 1, and FIG. 3 is a partial cross-sectional view of the electrical connector 10 in FIG. 1.

In this embodiment, the electrical connector 10 is configured for an installation of the circuit board 20, and the circuit board 20 can be installed on the electrical connector 10 in a lateral insertion manner. The circuit board 20 has a feeding terminal 21, two ground terminals 22 and two positioning holes 23. The feeding terminal 21 is located between the ground terminals 22, and the positioning holes 23 are respectively located at the ground terminals 22. The electrical connector 10 includes a signal joint 100 and a circuit board seat 200.

The signal joint 100 is, for example, a SMA joint, a 2.92 joint or a 2.4 joint. The signal joint 100 includes a coupling seat 110 and a terminal 120. The terminal 120 extends in the coupling seat 110 and sticks out of the coupling seat 110. The coupling seat 110 is configured to be assembled with a coaxial cable (not shown), and the terminal 120 is configured to be electrically connected to the coaxial cable.

The circuit board seat 200 includes a seat body 210, a clamp component 220 and two mount components 230. In addition, the circuit board seat 200 may further include two elastic components 240.

The seat body 210 includes a base portion 211, a mount portion 212 and two clamp portions 213. The mount portion 212 and the clamp portions 213 are respectively connected to two opposite sides of the base portion 211. The base portion 211, the mount portion 212 and the clamp portions 213 together form an accommodation recess 214. The base portion 211 of the seat body 210 is fixed to the coupling seat 110 of the signal joint 100, and the portion of the terminal 120 located outside the coupling seat 110 is disposed through the base portion 211, such that one end of the terminal 120 is located in the accommodation recess 214.

The end of the terminal 120 located in the accommodation recess 214 is configured to be in electrical contact with the feeding terminal 21 of the circuit board 20. In this embodiment, the mount portion 212 has two screw holes 2121 spaced apart from each other. The screw holes 2121 are connected to the accommodation recess 214. Each of the clamp portions 213 of the seat body 210 has an insertion hole 2131. The insertion holes 2131 are connected to the accommodation recess 214.

In this embodiment, each of the clamp portions 213 of the seat body 210 further has a contact surface 2132 located in the accommodation recess 214. The clamp component 220 is movably located in the accommodation recess 214 of the seat body 210. The clamp component 220 has a pressing surface 221, a back surface 222, two through holes 223, and two stopping structures 224 respectively located in the through holes 223. The pressing surface 221 of the clamp component 220 faces the contact surfaces 2132 of the clamp portions 213, and the pressing surface 221 of the clamp component 220 and the contact surfaces 2132 of the clamp portions 213 together form an installation space C in the accommodation recess 214. The end of the terminal 120 located in the accommodation recess 214 is also located in the installation space C. The installation space C is configured to accommodate the circuit board 20. The back surface 222 faces away from the pressing surface 221 and faces the mount portion 212 of the seat body 210. Two opposite sides of each of the through holes 223 are respectively located at the pressing surface 221 and the back surfaces 222 of the clamp component 220. The stopping structures 224 respectively protrude from inner surfaces of the through holes 223.

The elastic components 240 are, for example, compression springs. Each of the elastic components 240 is located between the stopping structure 224 in the through hole 223 and the mount portion 212 of the seat body 210. Two opposite ends of each of the elastic components 240 respectively press against the mount portion 212 of the seat body 210 and one side of the stopping structure 224 of the clamp component 220 located closer to the back surface 222. The elastic components 240 are configured to force the clamp component 220 to move towards the clamp portions 213.

In this embodiment, the seat body 210 may further include a stopping portion 215, and the stopping portion 215 is located in the installation space C and connected to the base portion 211. The stopping portion 215 has a stop surface 2151, and the stop surface 2151 faces the pressing surface 221 of the clamp component 220. The stop surface 2151 is located closer to the pressing surface 221 of the clamp component 220 than the contact surfaces 2132. As shown in FIG. 3, in the case that the force applied on the clamp component 220 is merely provided by the elastic components 240, the elastic components 240 force the clamp component 220 to press against the stop surface 2151 of the stopping portion 215, such that the clamp component 220 is spaced apart from the contact surfaces 2132 of the clamp portions 213 by a distance, and thus the installation space is maintained to have a specific volume.

In this embodiment, each of the clamp portions 213 of the seat body 210 may further has an inclined guide surface 2133, where the inclined guide surface 2133 has a first side **2133*a* and a second side 2133*b* located opposite to each other, the second side 2133*b* is connected to the contact surface 2132, and the first side 2133*a* is located farther away from the pressing surface 221 of the clamp component 220 than the second side 2133*b*. The inclined guide surfaces 2133 of the clamp portions 213 are configured to guide the circuit board 20** into the installation space C.

The two mount components 230 correspond to the two screw holes 2121, the two elastic components 240, the two through holes 223 and the two insertion holes 2131, respectively. Therefore, the following paragraphs merely introduce one mount component 230 and the screw hole 2121, the elastic component 240, the through hole 223 and the insertion hole 2131 that correspond the mount component 230 in detail.

The mount component 230 is movably disposed through the screw hole 2121 of the mount portion 212 and the elastic component 240, and the mount component 230 is movably disposed in the through hole 223 of the clamp component 220. The mount component 230 is movable between a released position and an installation position. Specifically, the mount component 230 includes a first portion 231 and a second portion 232 connected to each other. The first portion 231 is a stud. The second portion 232 is movably disposed in the through hole 223 of the clamp component 220 so as to be connected to the clamp component 220, such that the seat body 210, the clamp component 220 and the mount component 230 together constitute one body. The second portion 232 is located closer to the clamp portion 213 than the first portion 231. The second portion 232 has a flange 2321 located at one end of the second portion 232 farther away from the first portion 231.

As shown in FIG. 3, when the mount component 230 is located in the released position, one end of the second portion 232 of the mount component 230 located farther away from the first portion 231 is located in the through hole 223 of the clamp component 220, the second portion 232 does not stick out of the pressing surface 221 of the clamp component 220 and is not inserted into the insertion hole 2131 of the clamp portion 213, the flange 2321 of the second portion 232 of the mount component 230 is in contact with one side of the stopping structure 224 located closer to the pressing surface 221, and the first portion 231 of the mount component 230 is not screwed into the screw hole 2121 of the mount portion 212.

In this embodiment, when the mount component 230 is in the released position and the first portion 231 is not screwed into the screw hole 2121 of the mount portion 212, the stopping structure 224 in the through hole 223 of the clamp component 220 can support the flange 2321 of the second portion 232 of the mount component 230 so as to hold the mount component 230 on the mount portion 212 of the seat body 210 and the clamp component 220.

Figure 4:
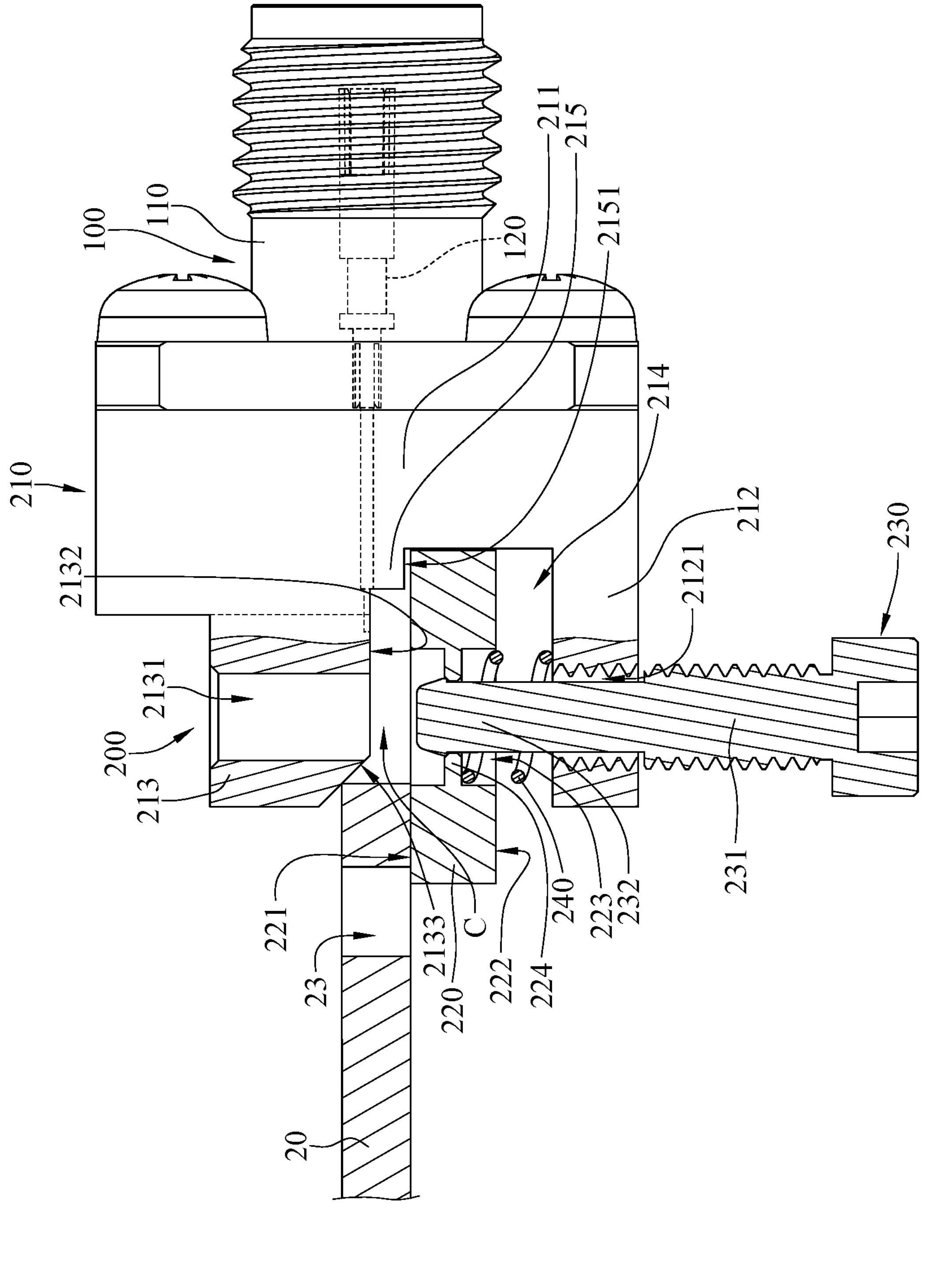
FIGS. 4 to 6 are partial cross-sectional views showing an installation process of the circuit board onto the electrical connector in FIG. 1.
Figure 5:
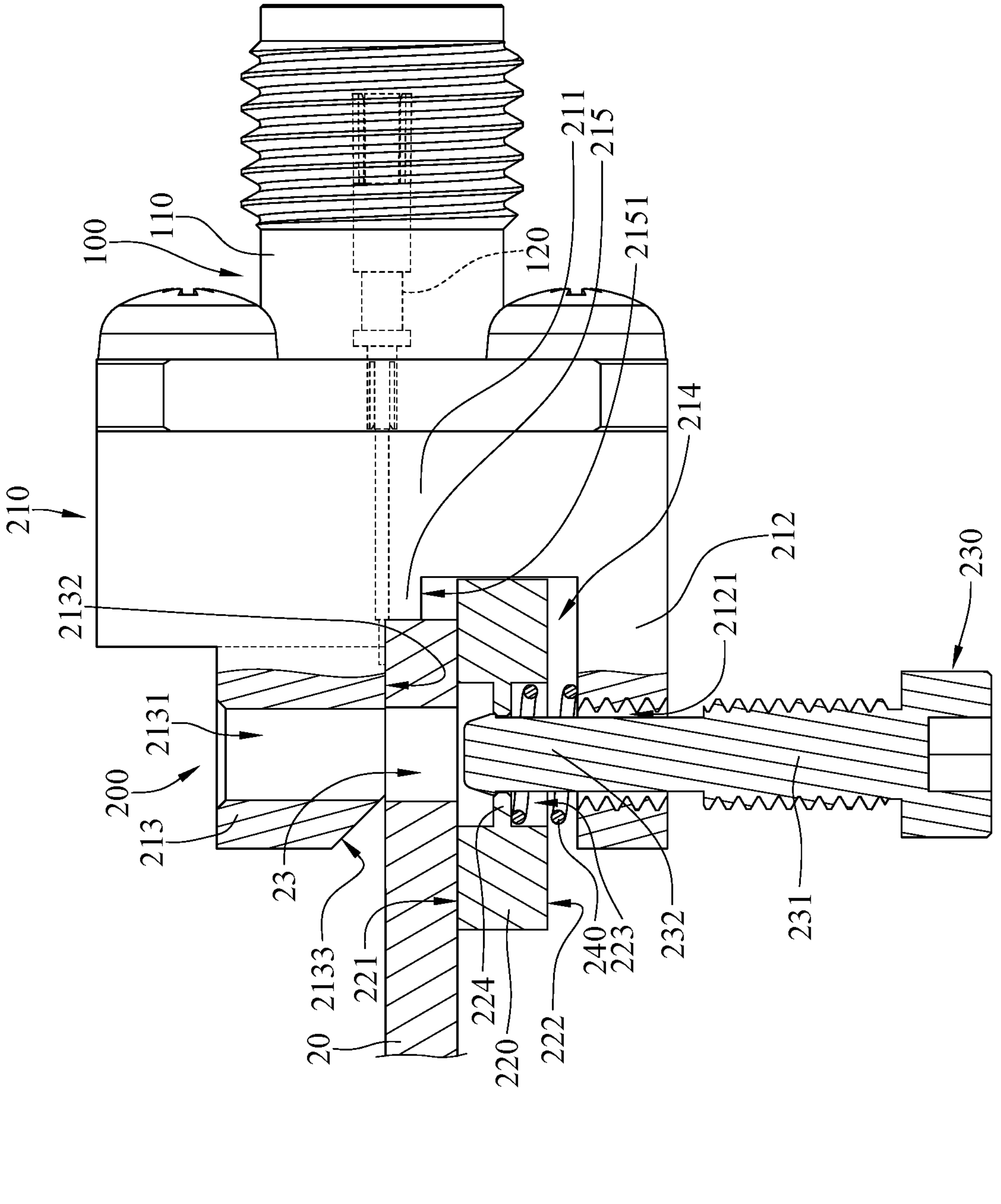
Figure 6:
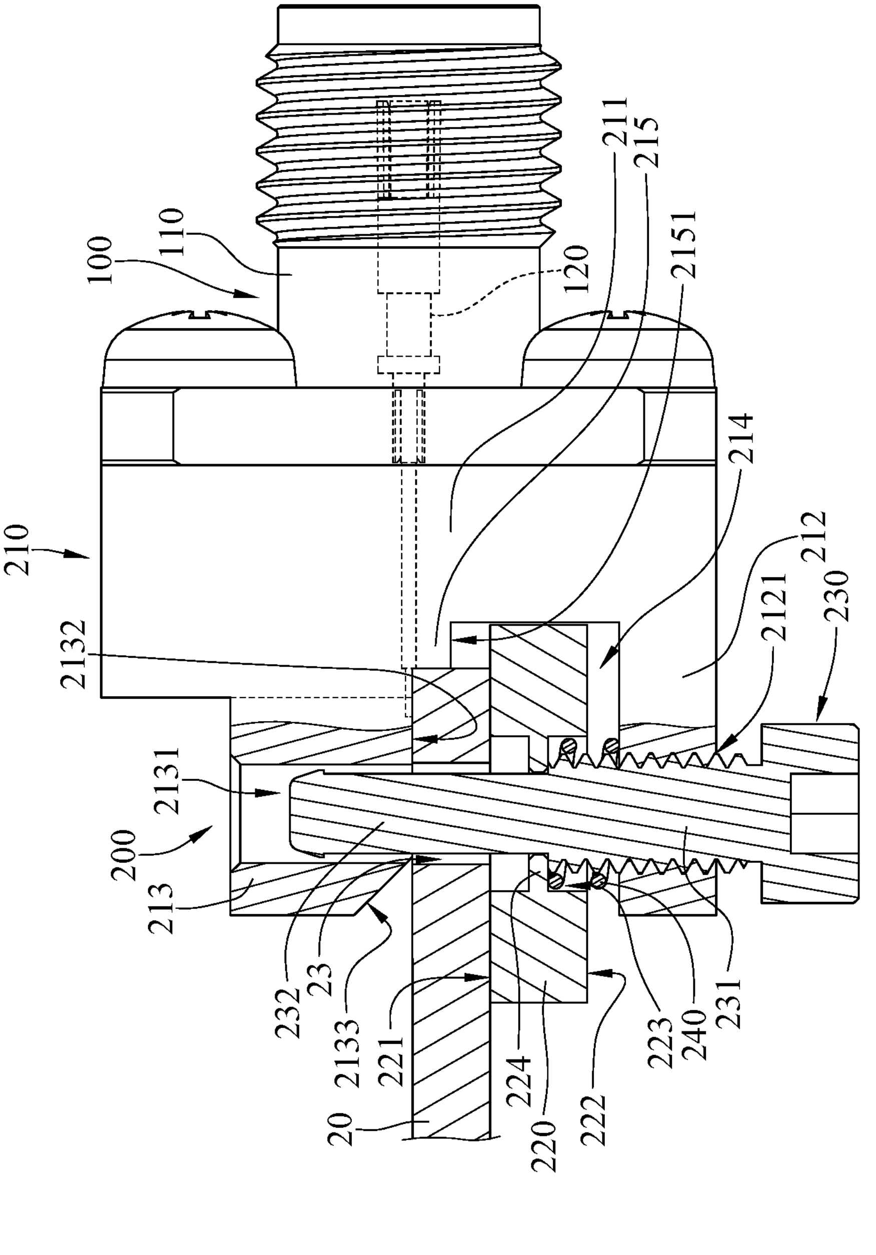

Then, the following paragraphs will introduce the installation process of the circuit board 20 onto the seat body 210. Refer to FIGS. 4 to 6, where FIGS. 4 to 6 are partial cross-sectional views showing the installation process of the circuit board 20 onto the electrical connector 10 in FIG. 1.

As shown in FIG. 4, the mount component 230 is located in the released position at first. Then, one side of the circuit board 20 is placed on the pressing surface 221 of the clamp component 220 and in contact with the inclined guide surface 2133 of the clamp portion 213 of the seat body 210.

Then, as shown in FIG. 5, the circuit board 20 is moved towards the stopping portion 215 of the seat body 210, such that the circuit board 20 is guided by the inclined guide surface 2133 of the clamp portion 213 of the seat body 210 and pushes the clamp component 220 towards the mount portion 212 so as to compress the elastic component 240. After the circuit board 20 is in contact with the stopping portion 215, the positioning hole 23 of the circuit board 20 is aligned with the through hole 223 of the clamp component 220 and the insertion hole 2131 of the clamp portion 213, and the terminal 120 (as shown in FIG. 2) is in electrical contact with the feeding terminal 21 (as shown in FIG. 2) of the circuit board 20. At this moment, the force applied on the clamp component 220 by the elastic component 240 enables the circuit board 20 to be clamped between the pressing surface 221 of the clamp component 220 and the contact surface 2132 of the clamp portion 213 so as to position the circuit board 20 along a normal line of the pressing surface 221

In this embodiment, the inclined guide surface 2133 of the clamp portion 213 can guide the movement of the circuit board 20 and help the circuit board 20 to push the clamp component 220 towards the mount portion 212 during the installation of the circuit board 20 into the installation space C. Note that the inclined guide surface 2133 is an optional structure and may be omitted in some other embodiments.

In addition, the stopping portion 215 can maintain the installation space C to have a specific volume for facilitating the installation of the circuit board 20. Note that the stopping portion 215 is an optional structure and may be omitted in some other embodiments.

Then, as shown in FIG. 6, the first portion 231 of the mount component 230 is screwed into the screw hole 2121 of the mount portion 212, such that the mount component 230 is located in the installation position. At this moment, the second portion 232 of the mount component 230 sticks out of the pressing surface 221 of the clamp component 220, the second portion 232 of the mount component 230 is disposed through the positioning hole 23 of the circuit board 20 so as to position the circuit board 20 along a horizontal direction perpendicular to the normal line of the pressing surface 221, and the second portion 232 of the mount component 230 is inserted into the insertion hole 2131 of the clamp portion 213.

In this embodiment, the clamp component 220 is movably located in the accommodation recess 214 of the seat body 210, the mount portion 212 is provided on the seat body 210 for the mount component 230 to be movably disposed therethrough, and the mount component 230 is connected to the clamp component 220. Therefore, before the circuit board 20 is installed on the seat body 210, the clamp component 220 and the mount component 230 are already integrated on the seat body 210. As a result, during the installation of the circuit board 20 onto the seat body 210, there is no need to sequentially assemble the clamp component 220 and the mount component 230, thereby increasing the installation efficiency of the circuit board 20 and preventing the clamp component 220 and the mount component 230 from going missing.

Note that the seat body 210 is not restricted to having the mount portion 212. In some other embodiments, the seat body may not have the mount portion. In such arrangement, the first portion of the mount component may be a horizontal arm which is movably disposed on the base portion of the seat body, and the second portion of the mount component may be a vertical arm which is connected to clamp component, such that the seat body, the clamp component and the mount component constitute one body, and the first portion of the mount component is located farther away from the clamp portion than the second portion. As a result, in the case that there is no mount portion additionally provided on the seat body, the aforementioned arrangements can still achieve that before the circuit board is installed on the seat body of the circuit board seat, the clamp component and the mount component are already integrated on the seat body of the circuit board seat. Therefore, during the installation of the circuit board onto the seat body, there is no need to sequentially assemble the clamp component and the mount component, thereby increasing the installation efficiency of the circuit board and preventing the clamp component and the mount component from going missing.

Moreover, the insertion hole 2131 of the clamp portion 213 allows the mount component 230 in the installation position to be inserted therein, such that different sides of the mount component 230 are respectively positioned by the mount portion 212 and the clamp portion 213, thereby further ensuring the mount component 230 to position the circuit board 20 along the horizontal direction perpendicular to the normal line of the pressing surface 221.

Furthermore, the insertion hole 2131 of the clamp portion 213 can guide the movement of the mount component 230 when the mount component 230 is moved from the released position towards the installation position. Note that the insertion hole 2131 of the clamp portion 213 is an optional structure and may be omitted in some other embodiments.

Note that the quantities of the clamp portions 213, the elastic components 240 and the mount components 230 are not restricted in the disclosure; in some other embodiments, the quantities of the aforementioned elements may all be one, and the quantities of through hole of the clamp component and the screw hole of the mount portion may also be one correspondingly.

In addition, the elastic component 240 is optional, and the mount component 230 is not restricted to being movable relative to the clamp component 220; in some other embodiments, the circuit board seat may not have the elastic component, and the mount component may be merely movable relative to the mount portion of the circuit board seat, and one end of the mount component may be fixed to the clamp component. In such arrangement, the mount component can move the clamp component to clamp the circuit board in the installation space.

According to the electrical connector and the circuit board seat as discussed in the above embodiment, the clamp component is movably located in the accommodation recess of the seat body of the circuit board seat, the mount portion is provided on the seat body for the mount component to be movably disposed therethrough, and the mount component is connected to the clamp component. Therefore, before the circuit board is installed on the seat body, the clamp component and the mount component are already integrated on the seat body. As a result, during the installation of the circuit board onto the seat body, there is no need to sequentially assemble the clamp component and the mount component, thereby increasing the installation efficiency of the circuit board and preventing the clamp component and the mount component from going missing.

In addition, the mount component is movably disposed on the seat body, and the second portion of the mount component is connected to clamp component, such that the seat body, the clamp component and the mount component constitute one body, and the first portion of the mount component is located farther away from the clamp portion than the second portion. As a result, before the circuit board is installed on the seat body of the circuit board seat, the clamp component and the mount component are already integrated on the seat body of the circuit board seat. Therefore, during the installation of the circuit board onto the seat body, there is no need to sequentially assemble the clamp component and the mount component, thereby increasing the installation efficiency of the circuit board and preventing the clamp component and the mount component from going missing.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electrical connector, configured for an installation of a circuit board, comprising:

a signal joint; and a circuit board seat, comprising:

a seat body, comprising a base portion, a mount portion and at least one clamp portion, wherein the base portion is fixed to the signal joint, the mount portion and the at least one clamp portion are respectively connected to two opposite sides of the base portion, and the base portion, the mount portion and the at least one clamp portion together form an accommodation recess;

a clamp component, movably located in the accommodation recess, wherein the clamp component and the at least one clamp portion together form an installation space, and the installation space is configured to accommodate the circuit board; and at least one mount component, movably disposed through the mount portion of the seat body of the circuit board seat, wherein the at least one mount component is connected to the clamp component;

wherein the clamp component has a pressing surface, a back surface and at least one through hole, the pressing surface faces the at least one clamp portion, the pressing surface and the at least one clamp portion together form the installation space, the back surface faces away from the pressing surface, two opposite sides of the at least one through hole are respectively located at the pressing surface and the back surface, the at least one mount component is movably disposed in the at least one through hole of the clamp component and movable between a released position and an installation position; when the at least one mount component is located in the released position, the at least one mount component does not stick out of the pressing surface; when the at least one mount component is located in the installation position, the at least one mount component sticks out of the pressing surface and is configured to be disposed through the circuit board;

wherein the at least one clamp portion has an insertion hole; when the at least one mount component is located in the released position, the at least one mount component is not inserted into the insertion hole; when the at least one mount component is located in the installation position, the at least one mount component is inserted into the insertion hole.

2. The electrical connector according to claim 1, wherein the circuit board seat further comprises at least one elastic component, the at least one elastic component is disposed in the accommodation recess, and the at least one elastic component is configured to force the clamp component to move towards the at least one clamp portion.

3. The electrical connector according to claim 2, wherein the at least one elastic component is a compression spring, and the at least one elastic component is located between the mount portion and the clamp component.

4. The electrical connector according to claim 1, wherein the seat body further comprises a stopping portion, the stopping portion is located in the installation space and connected to the base portion, the at least one clamp portion has a contact surface, the stopping portion has a stop surface, the contact surface and the stop surface face the clamp component, the contact surface and the clamp component together form the installation space, the stop surface is located closer to the clamp component than the contact surface, and the clamp component is configured to be in contact with the stop surface.

5. The electrical connector according to claim 4, wherein the at least one clamp portion further has an inclined guide surface, the inclined guide surface has a first side and a second side located opposite to each other, the second side is connected to the contact surface, and the first side is located farther away from the clamp component than the second side.

6. The electrical connector according to claim 1, wherein the clamp component further has at least one stopping structure, the at least one stopping structure protrudes from an inner surface of the at least one through hole, the at least one mount component has a flange located at one end of the at least one mount component; when the at least one mount component is located in the released position, the flange of the at least one mount component is in contact with one side of the at least one stopping structure located closer to the pressing surface.

7. The electrical connector according to claim 6, wherein the mount portion has at least one screw hole, the at least one mount component comprises a first portion and a second portion connected to each other, the first portion is a stud, the second portion is movably disposed in the at least one through hole of the clamp component; when the at least one mount component is located in the released position, the first portion of the at least one mount component is not screwed into the at least one screw hole, and the second portion does not stick out of the pressing surface; when the at least one mount component is in the installation position, the first portion of the at least one mount component is screwed in to the at least one screw hole, and the second portion sticks out of the pressing surface and is configured to be disposed through the circuit board.

8. An electrical connector, configured for an installation of a circuit board, comprising:

a signal joint; and a circuit board seat, comprising:

a seat body, fixed to the signal joint and having a clamp portion;

a clamp component, movably disposed on the seat body, wherein the clamp component and the clamp portion together form an installation space; and at least one mount component, movably disposed on the seat body, wherein the at least one mount component comprises a first portion and a second portion connected to each other, the second portion is connected to the clamp component, the seat body, the clamp component and the at least one mount component together constitute one body, and the first portion is located farther away from the clamp portion than the second portion;

wherein the clamp component has a pressing surface, a back surface and at least one through hole, the pressing surface faces the clamp portion, the pressing surface and the clamp portion together form the installation space, the back surface faces away from the pressing surface, two opposite sides of the at least one through hole are respectively located at the pressing surface and the back surface, the at least one mount component is movably disposed in the at least one through hole of the clamp component and movable between a released position and an installation position; when the at least one mount component is located in the released position, the at least one mount component does not stick out of the pressing surface; when the at least one mount component is located in the installation position, the at least one mount component sticks out of the pressing surface and is configured to be disposed through the circuit board;

wherein the clamp portion has an insertion hole; when the at least one mount component is located in the released position, the at least one mount component is not inserted into the insertion hole; when the at least one mount component is located in the installation position, the at least one mount component is inserted into the insertion hole.

9. A circuit board seat, configured for an installation of a circuit board, comprising:

a seat body, comprising a base portion, a mount portion and at least one clamp portion, wherein the mount portion and the at least one clamp portion are respectively connected to two opposite sides of the base portion, and the base portion, the mount portion and the at least one clamp portion together form an accommodation recess;

a clamp component, movably located in the accommodation recess, wherein the clamp component and the at least one clamp portion together form an installation space, and the installation space is configured to accommodate the circuit board; and at least one mount component, movably disposed through the mount portion of the seat body of the circuit board seat, wherein the at least one mount component is connected to the clamp component;

wherein the clamp component has a pressing surface, a back surface and at least one through hole, the pressing surface faces the at least one clamp portion, the pressing surface and the at least one clamp portion together form the installation space, the back surface faces away from the pressing surface, two opposite sides of the at least one through hole are respectively located at the pressing surface and the back surface, the at least one mount component is movably disposed in the at least one through hole of the clamp component and movable between a released position and an installation position; when the at least one mount component is located in the released position, the at least one mount component does not stick out of the pressing surface; when the at least one mount component is located in the installation position, the at least one mount component sticks out of the pressing surface and is configured to be disposed through the circuit board;

wherein the at least one clamp portion has an insertion hole; when the at least one mount component is located in the released position, the at least one mount component is not inserted into the insertion hole; when the at least one mount component is located in the installation position, the at least one mount component is inserted into the insertion hole.

* * * * *